(12) United States Patent
Griffin

(10) Patent No.: US 8,237,455 B2
(45) Date of Patent: Aug. 7, 2012

(54) OCCUPANT DETECTION SYSTEM WITH ENVIRONMENTAL COMPENSATION

(75) Inventor: Dennis P. Griffin, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 446 days.

(21) Appl. No.: 12/432,975

(22) Filed: Apr. 30, 2009

(65) Prior Publication Data

US 2009/0271076 A1    Oct. 29, 2009

Related U.S. Application Data

(63) Continuation-in-part of application No. 12/150,439, filed on Apr. 28, 2008, now Pat. No. 7,876,106.

(60) Provisional application No. 61/126,120, filed on May 1, 2008.

(51) Int. Cl.
*G01R 27/26* (2006.01)
(52) U.S. Cl. ........................ 324/681; 324/658
(58) Field of Classification Search ........... 324/681–685
See application file for complete search history.

(56) References Cited

U.S. PATENT DOCUMENTS

| | | | |
|---|---|---|---|
| 5,914,610 A | 6/1999 | Gershenfeld et al. | |
| 6,161,070 A | 12/2000 | Jinno et al. | |
| 6,179,378 B1 | 1/2001 | Baumgartner et al. | |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,816,077 B1 | 11/2004 | Shieh et al. | |
| 6,877,606 B2 | 4/2005 | Hardy | |
| 6,960,841 B2 | 11/2005 | Saitou et al. | |
| 7,048,338 B2 | 5/2006 | Pinkos | |
| 7,084,763 B2 | 8/2006 | Shieh et al. | |
| 7,102,527 B2 | 9/2006 | Shieh et al. | |
| 7,151,452 B2 | 12/2006 | Shieh | |
| 7,194,346 B2 | 3/2007 | Griffin et al. | |
| 2003/0090376 A1* | 5/2003 | Thompson et al. | 340/541 |
| 2004/0111201 A1 | 6/2004 | Thompson et al. | |
| 2005/0253712 A1 | 11/2005 | Kimura et al. | |
| 2006/0187038 A1* | 8/2006 | Shieh et al. | 340/562 |

FOREIGN PATENT DOCUMENTS

WO    W09513204    5/1995

OTHER PUBLICATIONS

Pending patent application for U.S. Appl. No. 12/150,439, filed Apr. 28, 2008.
Pending patent application for U.S. Appl. No. 12/433,011, filed Apr. 30, 2009.

* cited by examiner

*Primary Examiner* — Vincent Q Nguyen
(74) *Attorney, Agent, or Firm* — Lawrence D. Hazelton

(57) ABSTRACT

An occupant detection system includes an electrode in communication with a detector circuit that detects the impedance of the electrode and compensates for environmental conditions, such as humidity or moisture, based on the impedance measurement. Such environmental conditions may interfere with the occupant detection system's ability to detect the presence and/or size of an occupant. Typically, environmental conditions change the impedance of the electrode. The impedance is determined by measuring a frequency response of the electrode. The measured frequency response is compared to predetermined frequency response values that correspond to known environmental conditions. The environmental condition may be detected by matching the peak frequency response or average frequency response to in a lookup table.

17 Claims, 5 Drawing Sheets

OCCUPANT DETECTION SYSTEM WITH ENVIRONMENTAL COMPENSATION

CROSS-REFERENCE TO RELATED APPLICATIONS

This application is a continuation-in-part of U.S. patent application Ser. No. 12/150,439, filed on Apr. 28, 2008, now U.S. Pat. No. 7,876,106 the contents of which are fully incorporated herein by reference. In addition, this application claims priority to U.S. Provisional Application Ser. No. 61/126,120, filed on May 1, 2008.

BACKGROUND

Occupant detection systems have the ability to determine the presence and/or characteristics of an occupant at a specific location. However, environmental conditions, such as humidity and moisture, may interfere with the occupant detection system's readings.

Although useful in a wide variety of industries, occupant detection systems may be used in automotive applications to determine whether a person is present in a vehicle, and if so, the size of the person. This information may be used for various purposes, including enabling/disabling an airbag system. In many vehicles, each seat has at least one corresponding airbag. Generally, during an accident, the airbags are deployed so long as a person is detected in the corresponding seat. For this reason, the occupant detection system further determines the person's size before enabling/disabling the airbag system.

Although occupant detection systems are generally reliable, environmental conditions like humidity in the air or moisture on the seat may interfere with the occupant detection system's ability to determine the person's presence or size. For instance, the humidity or moisture may cause some children or car seats to be mischaracterized as adults. Accordingly, an occupant detection system is needed that compensates for environmental conditions, such as humidity and moisture, which may interfere with the occupant detection system's readings.

BRIEF SUMMARY

An occupant detection system includes an electrode and a detector circuit in communication with the electrode. The detector circuit is configured to detect an environmental condition based on an impedance of the electrode. Furthermore, a method includes detecting the impedance by measuring a frequency response of the electrode, and compensating for the environmental condition indicated by the frequency response.

BRIEF DESCRIPTION OF THE DRAWINGS

The present embodiments become better understood by reference to the following detailed description when considered in connection with the accompanying drawings, wherein.

DETAILED DESCRIPTION

An occupant detection system includes an electrode in communication with a detector circuit that detects an occupant and compensates for environmental conditions, such as humidity or moisture. The electrode is used to generate an electromagnetic field. The impedance of the electrode is represented by a load coupled to the electrode, and is indicative of the presence and/or size of an occupant near the electrode. Environmental conditions such as humidity or moisture may influence the impedance and interfere with the occupant detection system's ability to accurately determine the presence and/or size of an occupant. In the vehicle, moisture levels around the seat change instantly due to spilled drinks, rain coming through an open window or door, a sick child, a wet bathing suit, or from humidity in the air, among others. This moisture may cause the occupant detection system to detect a person who is not present in the seat, or misclassify children as adults since the environmental condition may change the apparent impedance of the occupant. To accurately detect the presence and size of passengers, automotive systems rely on the occupant detection system to function independently of changes in environmental conditions. For example, the occupant detector system is able to enable or disable an airbag system based on the presence and size of the passenger without interference from environmental conditions because the occupant detection system can detect and compensate for environmental conditions.

Figure 5:
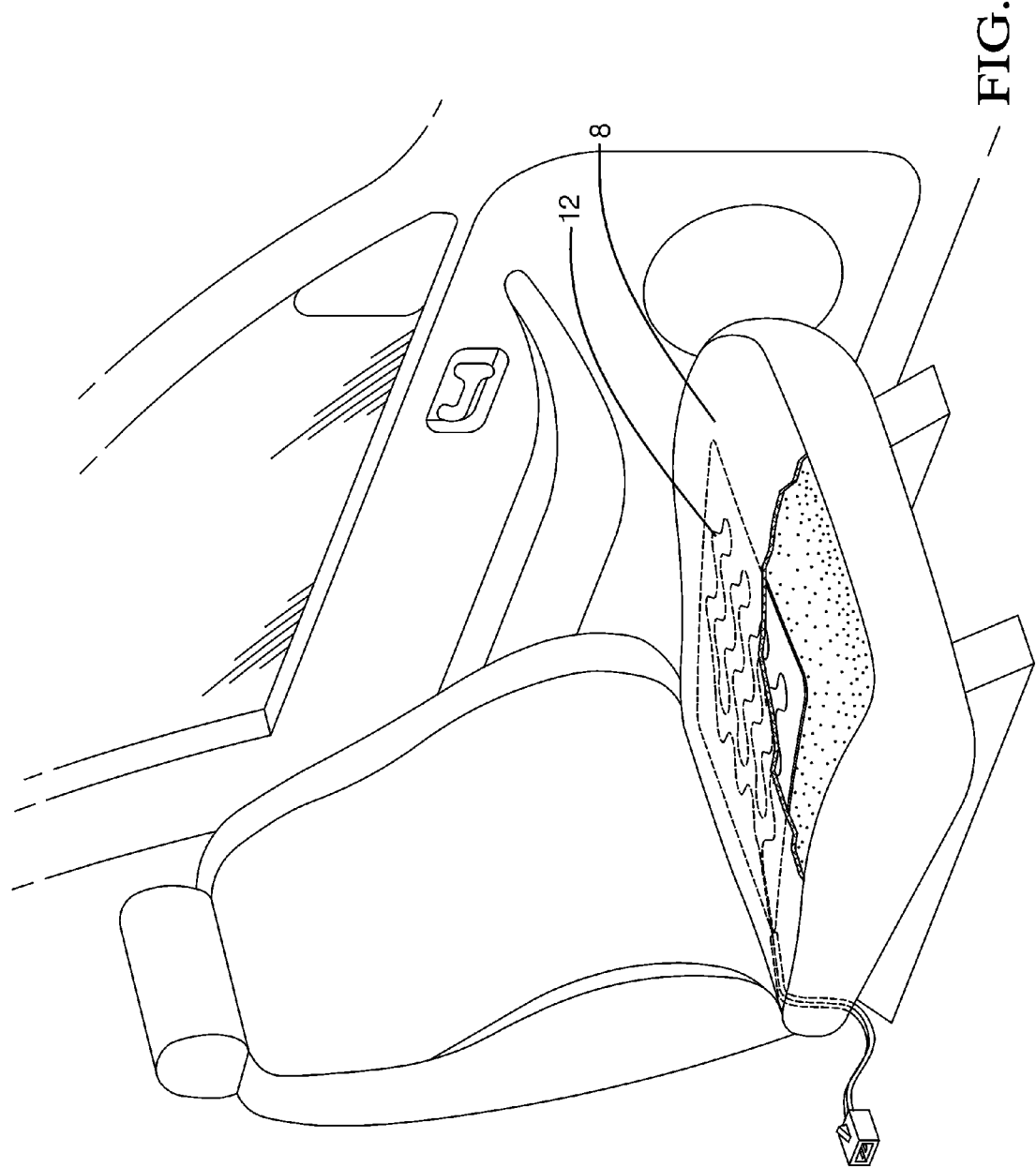
FIG. 5 is a perspective view of a seat assembly.

FIG. 5 is a perspective view of a seat assembly 8 having an electrode 12 disposed within the seat assembly 8, underneath the seat upholstery. The seat assembly 8 is shown within a vehicle interior and is for supporting an occupant (not shown). The occupant may be an individual person of any size, either sitting on the seat or may be an infant or child sitting in a child seat, where the child seat is secured to the seat assembly 8 with a seat belt (not shown) or some other means of secure attachment. The electrode 12 is depicted as a wire similar to a seat heating element, but could also be formed using foil or other electrically conductive element.

Figures 1A, 1B:
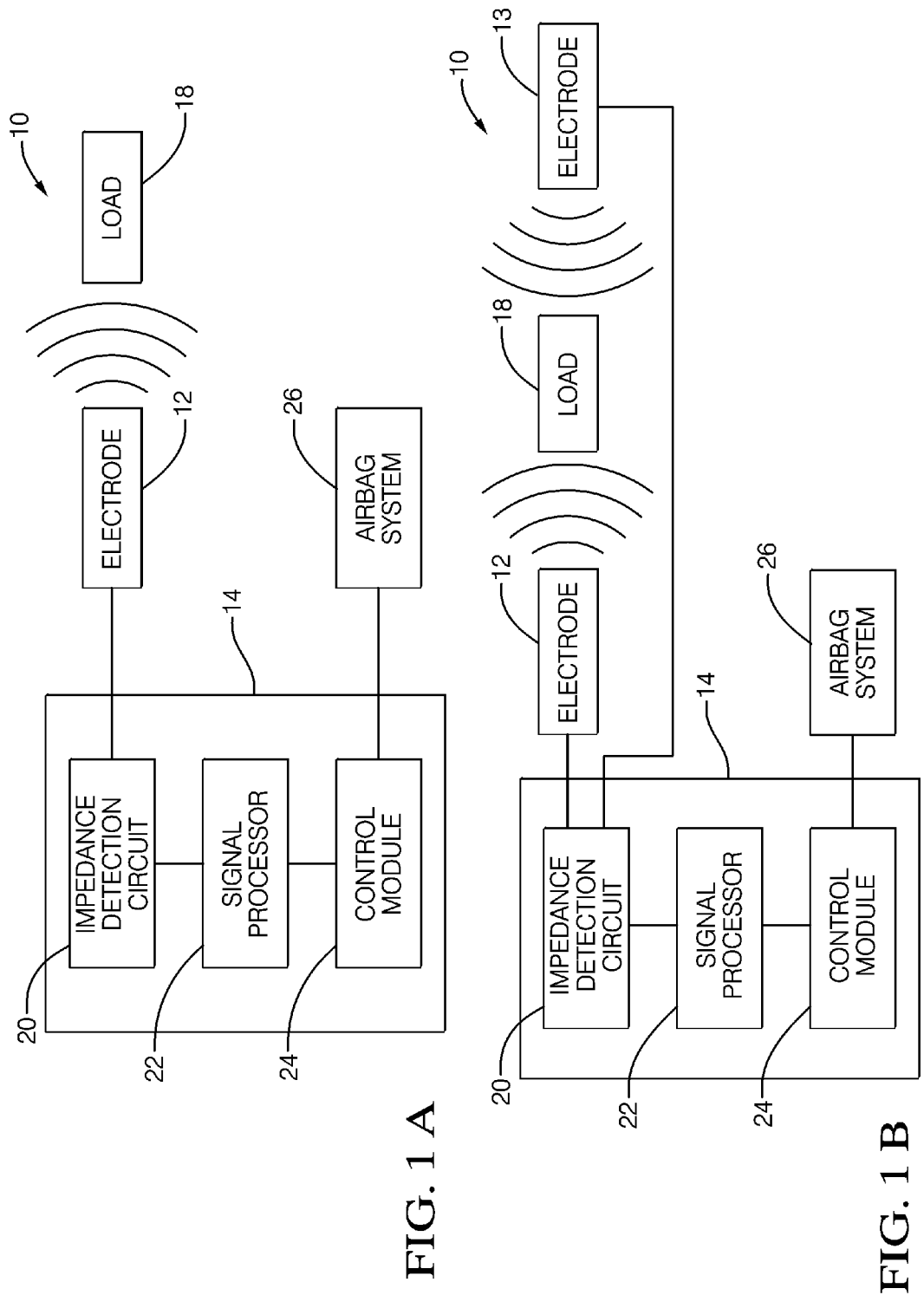
FIG. 1A is a block diagram of an exemplary occupant detection system, according to an embodiment.
FIG. 1B is a block diagram of an exemplary occupant detection system using multiple electrodes, according to an embodiment.

FIG. 1A is a block diagram of an exemplary occupant detection system 10 that includes the electrode 12 having an impedance in communication with a detector 14. The electrode 12 receives the signals generated by the detector 14 and radiates an electromagnetic field toward an object to be detected. A load 18 is a variable load coupled to the electrode 12 for establishing the impedance of the electrode 12. The load 18 is indicative of the size of a seat occupant or an empty seat, and an environmental condition. The detector 14 outputs a signal to an airbag system 28 to enable the airbag based on the determined size of an occupant. Changing environmental conditions may adversely affect the ability of the detector 14 to determine the size of the occupant, so the detector 14 is configured to compensate the impedance readings for the environmental condition. Thus, the detector 14 is in communication with the electrode 12 and is configured to detect an impedance indicative of the load 18, determine the presence of an environmental condition based on the impedance, and determine an occupant based upon the impedance and the environmental condition. Although only one electrode 12 is illustrated, it is appreciated that the system 10 may include multiple electrodes 12. FIG. 1B illustrates and embodiment where the system 10 includes an additional electrode 13 where the additional electrode 13 illustrates an electrical return path for the detector 14. The practitioner of ordinary skill will recognize that an electrical return path is present when the occupant detection system is used in a vehicle, where the vehicle chassis and body act as the additional electrode and vehicle electrical ground network may act as an electrical return path.

Figure 2:
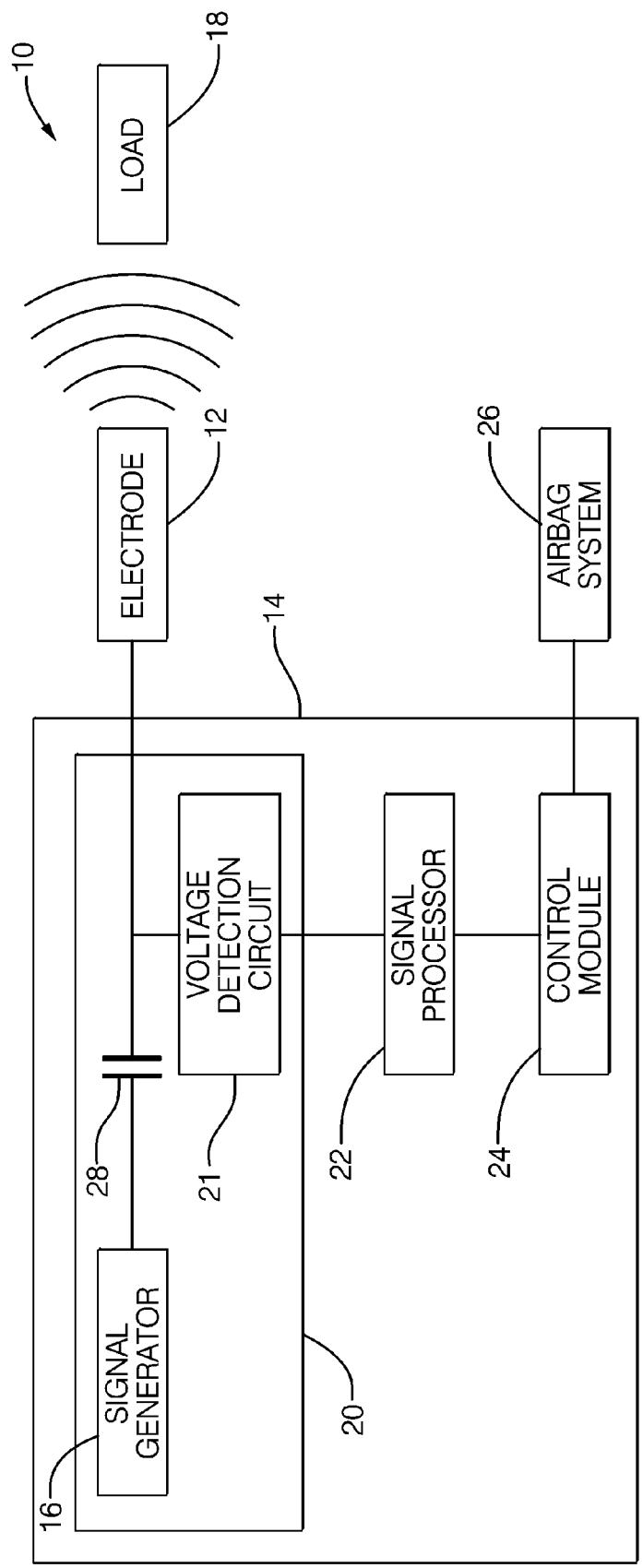
FIG. 2 is a block diagram of another exemplary occupant detection system according to an embodiment.

FIG. 2 illustrates a way that the detector 14 determines impedance. Signal generator 16 generates a signal, preferably sinusoidal, having generally the same magnitude but different frequencies. The signals from the signal generator 16 pass through a component having a known reference impedance. By way of example, the reference impedance is illustrated as a capacitor 28. An exemplary value for the capacitor 28 is 100 pF. Depending on features of the seat in which the electrode 12 is installed, features of the vehicle surrounding the seat, and the size of an occupant of particular interest, other values of capacitance may be preferable. Since the magnitude and phase of the signal from the signal generator are known, and the reference impedance is known, the magnitude and phase of the signal present on the electrode 12 are detectable by voltage detection circuit 21 and used to determine the impedance of the electrode 12.

If the voltage detection circuit is only capable of detecting magnitude, the impedance can be determined by the signal generator 16 generating a signal at a plurality of frequencies. By way of example, the detector 14 generates a first signal at a first frequency, a second signal at a second frequency, and so on, over a range of frequencies. This technique is described in more detail in U.S. patent application Ser. No. 12/150,439 by Hansen et al., filed May, 28, 2008. The range of frequencies may be any range in which the signal generator 16 and voltage detection circuit 21 can reliably operate and are found to be useful for occupant detection. An exemplary range of frequencies for occupant detection system 10 is about 10 KHz to about 1.0 MHz, although this range is merely exemplary for a given electrode 12.

The impedance detection circuit 20 includes a voltage detection circuit 21 in communication with the signal generator 16 through the capacitor 28, and with the electrode 12. The voltage detection circuit 20 is configured to detect a voltage between the capacitor 28 and the electrode 12 at each of the frequencies output by signal generator 16. In other words, as the detector 14 outputs a signal and sweeps through the frequencies the voltage detection circuit 21 samples the voltage on the electrode 12 at predetermined intervals. The impedance of load 18 has been found to be predominately capacitive in nature, although the impedance of load 18 includes parallel and series resistive contributions. By using the capacitor 28 as a reference impedance and having the signal generator 16 output sinusoidal signals through the capacitor 28, a voltage divider is formed so the impedance of load 18 may be determined. For example, if voltage detection circuit 21 only detects the magnitude of the signal present on electrode 12, then the capacitive portion of the impedance of load 18 can be indicated by comparing the magnitude of the signal from the signal generator 16 to the magnitude of the signal present on electrode 12.

A frequency response of the electrode 12 is based on the impedance of the electrode 12 and indicates the presence of an environmental condition such that the presence of an environmental condition is manifested as a change in the frequency response of the electrode 12. Accordingly, the voltage detection circuit 21 may be configured to measure phase and/or magnitude of a signal on electrode 12 relative to some reference, such as a signal generator 16 for example, over a range of frequencies at the electrode 12. The detector 14 includes a signal processor 22 in communication with the voltage detection circuit 21. The signal processor 22 may be configured to determine for a given frequency, either a peak value from a number of values received from the voltage detector circuit 21 over a period of time, or an average value calculated from a number of values received from the voltage detector circuit 21 over a period of time. The signal processor 22 is also configured to compare the frequency response to a plurality of predetermined values stored in a lookup table to determine whether the environmental condition is present. A frequency response value may be a peak frequency response value for a number of frequencies, or an average frequency response value for a number of frequencies. Each of the predetermined frequency response values corresponds to the existence and magnitude of specific environmental conditions, or lack thereof. Thus, the environmental condition may be detected by matching the frequency responses measured to the predetermined values in the lookup table.

In order to isolate and discriminate a peak frequency response value from the frequency response data, the signal processor 22 may apply a correlation type filter kernel to the data received from the voltage detection circuit 20, which represents the voltage measured at each of the frequencies. The filter kernel may be a multiply and accumulate matrix operation performed by the signal processor 22 through software. In particular, the signal processor 22 collects the data measured by the voltage detection circuit 20 into a matrix. The values in the matrix are the values of the signal taken at specific intervals along at least part of the operating range of the electrode 12. This matrix is then multiplied by the filter kernel, which includes another matrix having numbers that magnify the peak frequency. For example, if the signal is sampled five times over the range of the frequencies applied to electrode 12, the result could be a matrix having five numbers, such as 2, 4, 8, 4, and 2, which may result in a bell curve if graphed. Then, the filter kernel is applied to another set of data that at least partially overlaps the previous set of data. For example, the filter kernel may first be applied to data taken at 10, 20, 30, 40, and 50 kHz. Then, the filter kernel may be applied to data taken at 20, 30, 40, 50, and 60 kHz, and so on, with the results of each application of the filter kernel being summed together. Once the filter kernel is applied, the peak frequency response is more easily defined.

The detector 14 further includes a control module 24 in communication with the signal processor 22. The control module 24 receives signals and data transmitted by the signal processor 22 and determines whether the environmental condition exists. Specifically, the control module 24 determines whether the peak frequency response and the average frequency response correspond to any predetermined values in the lookup table that indicate the presence and/or magnitude of an environmental condition. Then, control module 24 is configured to compensate for the environmental condition by outputting a signal independent of the effects of the environmental conditions. In other words, once the environmental condition has been detected, the control module 24 may remove the effects of the environmental condition and output a signal compensated for the present environmental.

In one embodiment, the occupant detection system 10 may be used in a vehicle with an airbag system 26. The airbag system 26 may be selectively enabled or disabled based on characteristics of the passenger in the seat. For instance, it may be beneficial to only enable the airbag system 26 if an adult or larger child is sitting in the vehicle seat. Generally, impedance is inversely proportional to the size of the object because the capacitive component of the impedance is proportional to the size of the object. Therefore, a larger person will have a lower impedance, and because the electrode 12 can detect impedance, the occupant detection system 10 can detect the size of the person in the seat. However, since environmental conditions may affect the impedance of the load 18, without compensating for environmental conditions, the airbag system 26 may be enabled or disabled at inappropriate times. To compensate, the airbag system 26 receives the signal from the control module 24 indicating whether the airbag system 26 should be enabled or disabled based on the size and presence of the occupant independent of the environmental conditions.

Figure 3:
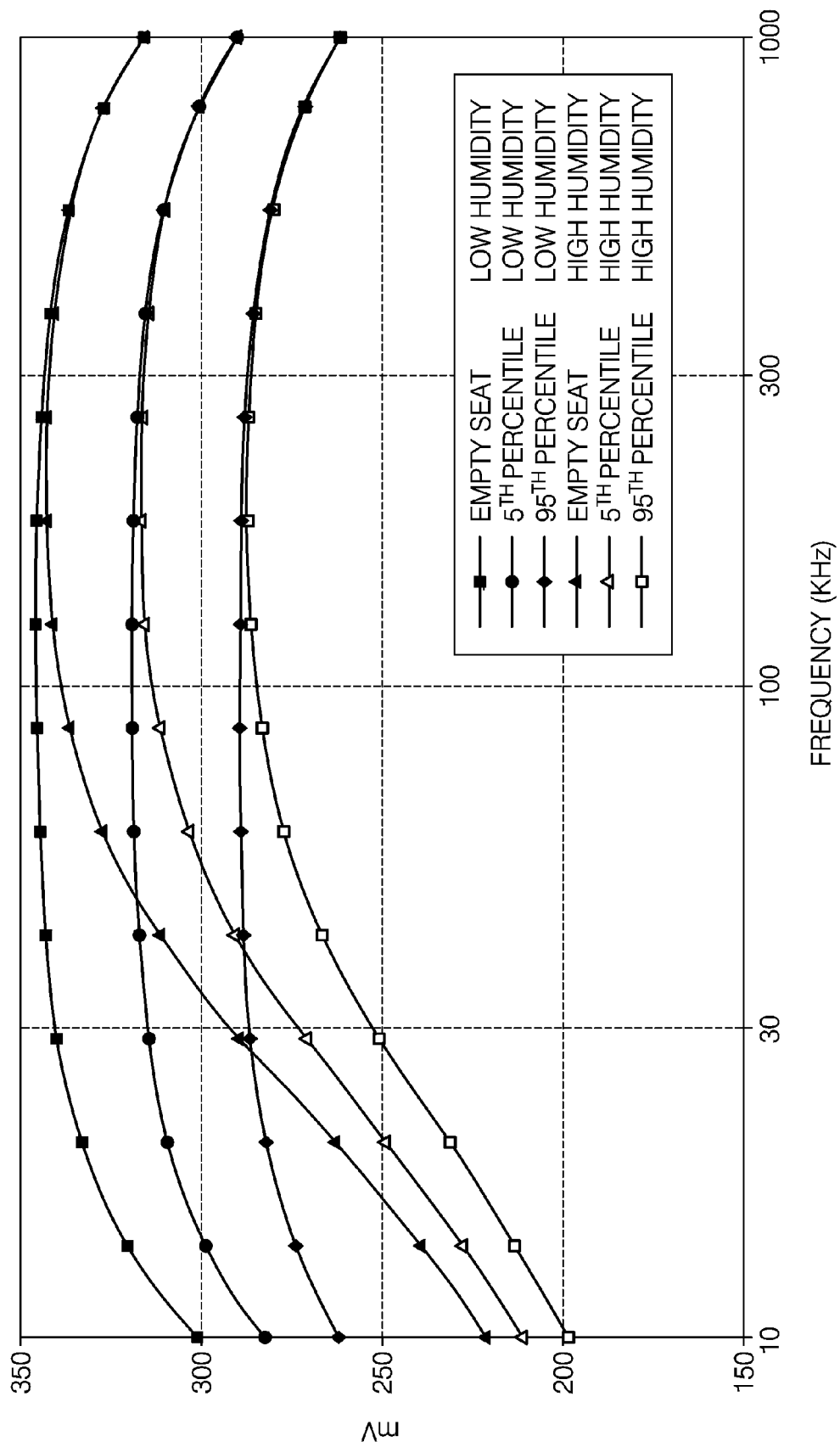
FIG. 3 is an exemplary graph illustrating the effect of various environmental conditions on the frequency response of the exemplary occupant detection system, according to an embodiment.

Under various levels of humidity, the electrode 12 responds well to the size of the occupant, and larger occupants (i.e., adults) are consistently distinguished from smaller occupants (i.e., small children or car seats). FIG. 3 is an exemplary graph illustrating the effect of environmental conditions on the frequency response of the exemplary occupant detection system 10 during a test. Using the detector 14 shown in FIG. 2, signals of various frequencies are applied to the electrode 12. The voltage detection circuit 21 for this test is configured to detect a signal magnitude at the electrode 12 at each of the frequencies applied to the electrode 12, here, between about 10 kHz and about 1000 kHz. The magnitude of the signal on electrode 12 changes based on the frequency and the presence and magnitude of the environmental conditions present. Voltage magnitude data was recorded at a number of frequencies for and empty seat, a $5^{th}$ percentile occupant corresponding to a 5 foot tall, 100 pound female, and a $95^{th}$ percentile occupant corresponding to a 6 foot-2 inch, 220 pound male. The frequency response for each test condition is plotted to form six data string on the graph. Three data strings correspond to a low humidity condition, i.e.—a dry seat, and three strings correspond to a high humidity conditions, i.e.—a wet seat. As can be seen, at lower frequencies, the magnitude of the environmental condition is inversely proportional to the voltage. In other words, as the magnitude of the environmental conditions increases, the voltage at lower frequencies decreases. This may cause the occupant detection system 10 to mischaracterize the presence or size of the occupant. For example, a child car seat that is tightly belted (e.g., a child) may be interpreted as a $5^{th}$ percentile occupant (e.g., smaller adult) because of the environmental condition. However, the occupant detection system 10 of FIGS. 1 and 2 compensates for the environmental condition by removing the effects on impedance caused by the environmental condition.

Figure 4:
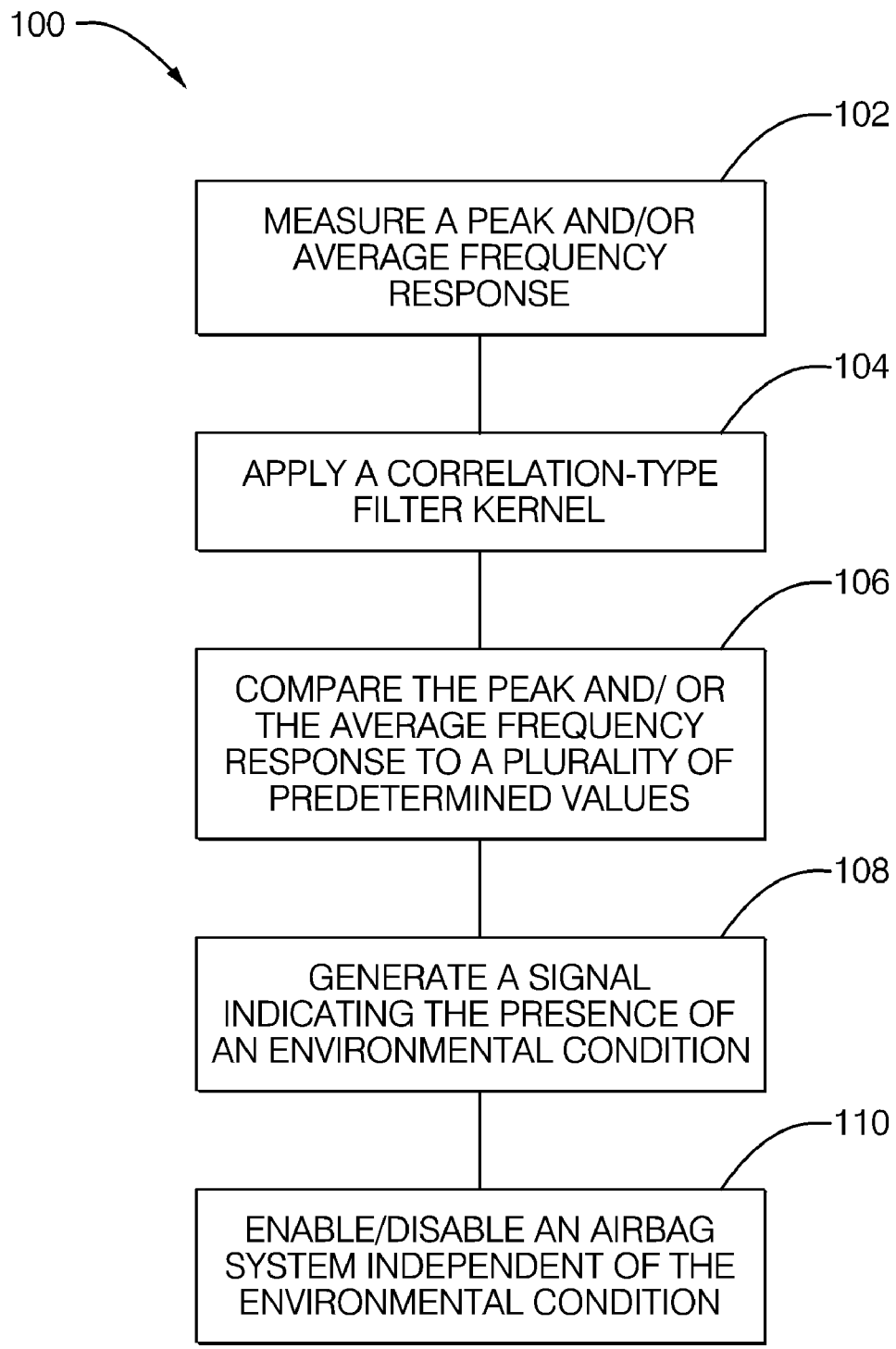
FIG. 4 is a flowchart of an exemplary method of detecting an occupant, according to an embodiment.

FIG. 4 is a flowchart of a method 100 of detecting an occupant. The method 100 includes measuring a frequency response of the electrode 12, detecting the presence of the environmental condition based on the frequency response of the electrode 12, and compensating for an environmental condition indicated by the frequency response. Measuring the frequency response of the electrode 12 may include a step 102 of measuring the peak frequency response and/or the average frequency response to the current occupant state over the operating range of the electrode 12, and a step 104 of applying the correlation type filter kernel to the data measured over the operating range of the electrode 12. Detecting the presence of the environmental condition based on the frequency response of the sensor 12 may include a step of 106 of comparing the peak frequency response and/or the average frequency response to the plurality of predetermined values stored in the lookup table. Compensating for the environmental condition may include a step 108 of generating a signal indicating the presence of the environmental condition, and a step 110 of enabling or disabling an airbag system 26 independent of the environmental condition.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An occupant detection system comprising:
    an electrode disposed in a seat; and
    a detector in communication with the electrode and configured to detect an impedance of the electrode indicative of a load corresponding to an occupant presence, determine of an environmental condition based on the impedance of the same electrode, and determine an occupant based upon the impedance of the same electrode and the environmental condition based on the same impedance of the same electrode.

2. An occupant detection system as set forth in claim 1, wherein the environmental condition is humidity or moisture.

3. An occupant detection system as set forth in claim 1, wherein said impedance is detected by determining a frequency response of said electrode.

4. An occupant detection system as set forth in claim 3, wherein said detector is configured to measure a peak frequency response over a range of frequencies.

5. An occupant detection system as set forth in claim 3, wherein said detector is configured to measure an average frequency response over a range of frequencies.

6. An occupant detection system as set forth in claim 1, said detector comprising a signal generator, wherein said signal generator is configured to generate a first signal at a first frequency and a second signal at a second frequency.

7. An occupant detection system as set forth in claim 6, said detector further comprising a voltage detection circuit in communication with said signal generator, and wherein said voltage detection circuit is configured to detect a voltage at a plurality of different frequencies.

8. An occupant detection system as set forth in claim 7, said detector further comprising a signal processor in communication with said voltage detection circuit.

9. An occupant detection system as set forth in claim 8, wherein said signal processor is configured to measure a peak frequency response of said electrode.

10. An occupant detection system as set forth in claim 9, wherein said signal processor is configured to compare the peak frequency response to a plurality of predetermined values stored in a lookup table to determine whether the environmental condition is present.

11. An occupant detection system as set forth in claim 9, wherein said signal processor is configured to apply a correlation type filter kernel to data received from said voltage detection circuit.

12. An occupant detection system as set forth in claim 8, wherein said signal processor is configured to measure an average frequency response of said electrode.

13. An occupant detection system as set forth in claim 12, wherein said signal processor is configured to compare the average frequency response to the plurality of predetermined values stored in a lookup table to determine whether the environmental condition is present.

14. An occupant detection system as set forth in claim 8, wherein said detector includes a control module in communication with said signal processor.

15. An occupant detection system as set forth in claim 14, wherein said control module is configured to receive a signal from said signal processor and detect and compensate for the environmental condition indicated by the signal if the environmental condition is present.

16. An occupant detection system as set forth in claim 14, further comprising an airbag system in communication with said control module, and wherein said control module is configured to enable or disable said airbag system independent of the environmental condition.

17. An occupant detection system as set forth in claim 1, wherein said electrode further defined as a first electrode and further comprising a second electrode in communication with said detector circuit.

* * * * *